United States Patent [19]

Geiger

[11] Patent Number: 4,721,621

[45] Date of Patent: Jan. 26, 1988

[54] PROCESS FOR THE PRODUCTION OF HIGH EXTRACT-TO-ALCOHOL BEERS

[75] Inventor: Kenneth H. Geiger, London, Canada

[73] Assignee: Labatt Brewing Company Limited/La Compagnie de Brassage Labatt Limitee, London, Canada

[21] Appl. No.: 667,561

[22] Filed: Nov. 2, 1984

[51] Int. Cl.$^4$ ............................................. C12C 11/04
[52] U.S. Cl. ...................................... 426/16; 426/29; 426/592
[58] Field of Search .................. 426/16, 11, 14, 28, 426/29, 592, 600, 493, 481, 494, 490; 435/93

[56] References Cited

U.S. PATENT DOCUMENTS

| | | | |
|---|---|---|---|
| 613,915 | 11/1898 | Uhlmann | 426/14 |
| 1,243,440 | 10/1917 | Nowak | 426/16 |
| 1,401,700 | 12/1921 | Heuser | 426/14 |
| 3,113,029 | 12/1963 | Hernandez | 426/16 |
| 4,140,799 | 2/1979 | Nagodawithana et al. | 426/16 |

*Primary Examiner*—Raymond N. Jones
*Assistant Examiner*—Marianne M. Cintins
*Attorney, Agent, or Firm*—Fisher, Christen & Sabol

[57] ABSTRACT

In accordance with the practice of the present invention, there is disclosed a process which is useful in the production of a beer having a high unfermentable-residual-malt-extract to alcohol ratio. The high extract-to-alcohol beer produced by this process may be, inter alia, an alcohol-reduced beer in its own right, or may be readily converted into an alcohol-reduced beer by the simple expedient of diluting with water.

16 Claims, No Drawings

PROCESS FOR THE PRODUCTION OF HIGH EXTRACT-TO-ALCOHOL BEERS

FIELD OF THE INVENTION

The present invention relates to a process which is, in particular, useful for the production of alcohol-reduced beer products, (ie. low-alcohol and alcohol-free beers), and high extract-to-alcohol beers which are useful as intermediates in the production of alcohol-reduced beer products as well as being beverages in their own right. As used in the context of the instant specification, the terms "low-alcohol" and "alcohol-free" embrace beers containing between about 1-3% and between about 1-0.5% alcohol or less, respectively, on a volume/volume basis.

BACKGROUND OF THE INVENTION

Consumer acceptance of beer products having reduced alcohol concentrations is a well established market place phenomenon. Most of the present day processes for producing alcohol-reduced beverages however, are based on technology which originated during the temperence and prohibition eras in North America.

Historically, processes for the production of alcohol-reduced beers typically entailed one of three basic approaches. The first such approach involved the use of distillation apparatus adapted to drive-off alcohol from an alcoholic beer by boiling the beer, in some instances under partial vacuum in an attempt to minimize the amount of heat damage incurred during such processing of the beverage. Variations on this general theme are disclosed, inter alia, in U.S. Pat. Nos. 613,915; 662,172; 721,383; 935,814; 977,303; 1,017,086; 1,084,833; 1,171,306; 1,202,662; 1,238,577; 1,234,811; 1,264,564; 1,286,315; 1,290,192; 1,302,549; and, 1,311,421. With the end of prohibition, attempts at boiling beer, especially at ambient atmospheric pressures, to drive-off the alcohol contained therein, were abandoned because the resulting products were not salable in the highly competitive, deregulated market place. The flavour of the boiled beer was compromised to the extent that it was not palatable. Accordingly, the processes disclosed in the above-listed patents are only of historical interest, although more recent refinements have been brought to bear on this general approach to the problem of reducing the alcohol content of regularly-brewed beers, (see for example U.S. Pat. No. 4,256,920 or UK Patent No. 2,113,712). All such distillation processes, however, remain disadvantageously energy intensive and inherently involve additional capital and operating expenditures which can seriously compromise their usefulness in a competitive, commercial scale brewery operation. Even when such processes are carried out with a de-esterizing column arranged in tandem with the dealcoholizing apparatus in order to return desirable volatiles to beer, important flavour cogeners are nonetheless lost along with the alcohol. Moreover, the relatively high temperatures used to distill the alcohol from the beer, almost invariably resulted in unacceptable damage to the flavour of the resulting beverage.

The second historical approach involved interrupting the fermentation of a conventionally prepared brewer's wort before the alcohol concentration developed beyond about 1-2%. The interruption can be achieved by filtering to remove the yeast and pasturizing the partially fermented wort. The resulting products, however, invariably have a strong, undesirable "worty" flavour.

The third approach was to utilize an unfermented brewer's wort as an alcohol-free beer, without any fermentation whatsoever. These products have an even stronger "wort" flavour.

More recently, the trend in the production of alcohol-reduced beers has included more progressive and diverse approaches to the problem. One example of such an approach is disclosed in UK No. 1,447,505, wherein there is described a reverse osmosis teatment which is adapted to dealcoholize a regularly-brewed beer. Unlike the distillation processes, such a reverse osmosis treatment does not cause heat damage to the beer flavour. However, the process remains subject to the other disadvantages mentioned above in respect of the distillation processes, in that reverse osmosis installations are very capital intensive. In addition, the nature of the reverse osmosis treatment is such that important flavour cogeners of the beer are lost along with the alcohol even though the amounts lost are less than those lost during dealcoholization with distillation apparatus.

Another approach involves the use of aerobic fermentations, while yet another calls for the use of specialized yeast strains (e.g. *S. ludwigii*), which do not produce large quantities of alcohol under normal fermentation conditions because the yeast is unable to utilize maltose.

One of the objectives of the present invention is to provide a brewing process adapted to produce a high extract-to-alcohol beer which is particularly useful both in and of itself, or as an intermediate in the production of alcohol-reduced beers, which process readily lends itself to established commercial scale brewery practices without requiring any extraordinary capital outlay or engendering any unusual maintainance costs. Moreover, it is a further object of the present invention to produce, by way of this novel process, a quality beer having a reduced alcohol concentration which beverage is subject neither to the undesirably worty flavour associated with partially fermented or entirely unfermented beers, as aforementioned, nor to the undesirable flavour problems characterizing those dealcoholized beers from which the alcohol has been removed by distillation in the traditional manner, or by way of reverse osmosis.

SUMMARY OF THE INVENTION

In accordance with one aspect of the present invention, therefore, there is provided a process which is useful in the production of a beer having a high unfermentable-residual-malt extract to alcohol ratio, which process consists essentially of the steps of: preparing an all-malt wort by mashing the malt in at a temperature of between 65 to 80 degrees C.; upwardly adjusting the pH of the mash to not more than about 7.0, said temperature and pH being selected so as to produce a fermentable wort having a desired degree of fermentability of substantially less than about 70%; maintaining said temperature throughout mashing; continuing to mash the malt for a time sufficient to substantially complete the conversion of the starch to fermentable and unfermentable sugars; hopping the wort to taste and kettle boiling the resulting mixture; and, fermenting the wort to completion in a fermenter. This is preferably accomplished without any additional fermentable adjunct having been added to the wort. Depending on the initial gravity of the wort and whether or not additionally fermentable adjunct has been added thereto, the high extract-to-alcohol beer produced by way of this process may be, inter alia, an alcohol-reduced beer in its own right, or may be readily converted into an alcohol-reduced beer by the simple expedient of diluting with water. The products of this process are not subjected to any distillation treatments and so are not subject to the heat-damaged flavour which is characteristic of alcohol-reduced beers that have been dealcoholized by distillation. Moreover, being as it is in most significant respects analogous to a conventional brewing process, the present process does not give rise to the loss of important flavour cogeners, as occurs in the case of the reverse osmosis brewing process mentioned above. Also, because the degree of fermentability can be tailored to achieve a specific alcohol concentration in the alcohol-reduced beer products of the present invention, there are no substantial amounts of residual, fermentable carbohydrates left in the wort following fermentation which could otherwise cause shelf-life instability problems through post-packaging fermentation. In this latter respect, the process of the present invention is not subject to the disadvantages which plague those prior art processes in which the fermentation is not permitted to go forward to completion.

DETAILED DESCRIPTION OF THE INVENTION

As mentioned in the preceeding summary, the present invention broadly relates to a process for producing a beer having a high unfermentable-residual-malt extract to alcohol ratio, which process consists essentially of the steps of: preparing an all-malt wort by mashing the malt in at a temperature of between 65 to 80 degrees C. and at a pH upwardly adjusted to between 5.0 and 7.0 said pH and temperature being selected so as to produce a fermentable wort having a desired degree of fermentability of substantially less than about 70%; maintaining said temperature throughout mashing; continuing to mash the malt for a time sufficient to substantially complete conversion of the starch to fermentable and unfermentable sugars; hopping the resulting wort to taste and kettle boiling the resulting mixture; and, fermenting the wort to completion in a fermentor, preferrably without any additional fermentable adjunct having been added.

Through careful selection and control of the initial gravity and the degree of fermentability of the wort, the resulting beer can have a predetermined alcohol concentration as well as a predetermined extract to alcohol ratio, whereby after conventional finishing and packaging of the beer, the beverage is market ready.

In commercial scale breweries, however, there is typically introduced a degree of variability which, notwithstanding the additional dimension of control that is made possible through adjusting the pH of the mash, makes it difficult to arrive at a product of exactly predetermined alcohol concentration and extract to alcohol ratio on completion of the fermentation. Such variability is, therefore, at odds with the desirability of obtaining a consistent product from brew to brew, and so it is a preferred practice under the present invention to utilize a post-fermentation dilution of the high-extract-to-alcohol intermediate, (i.e. the fermented wort), with water (and preferrably $O_2$ freewater) to precisely reproduce a pre-specified alcohol concentration from the product resulting from each and every brew. Notwithstanding the large scale of the operation, the observance of good brewing practices in general and close control over the degree of fermentability of the wort in particular, will enable the skilled brewer to minimize the differences between the amount of extract contained in the diluted beer and that called for in the product specification. In any case, small deficiencies in the amount of extract contained in the diluted product can then be readily compensated for through the addition of corresponding amounts of a dextrin material, (such as for example, 1-2% high dextrin corn syrup), or priming sugars, (e.g. glucose, sucrose etc).

In accordance with a preferred practice under the present invention therefore, there is provided a process consisting essentially of the steps of: preparing an all-malt wort by mashing the malt in at a temperature of between 65 to 80 degrees C. and at a pH upwardly adjusted to between 5.0 and 7.0 said temperature and pH being selected so as to produce a fermentable wort having a desired degree of fermentability of substantially less than about 70%; maintaining said temperature throughout mashing; continuing to mash the malt for a time sufficient to substantially complete conversion of the starch to fermentable and unfermentable sugars; hopping the wort to taste and kettle boiling the mixture; fermenting the wort to completion in a fermentor without any additional fermentable adjunct having been added thereto; and, thereafter diluting the fermented wort with $O_2$ free water to achieve a predetermined alcohol concentration in the resulting alcohol-reduced beer product. This process can, if deemed necessary or desirable by the brewer in any given instance, further include the step of adding additional dextrin materials to the beer to compensate for the loss of body resulting from the dilution step.

In accordance with the practice as set forth immediately hereinabove, there is provided one embodiment of the present invention wherein otherwise conventional and well known high gravity brewing techniques are employed to enhance the economics of such processing. Pursuant to those techniques (as they apply in the context of the present invention) the wort that is prepared as per the above, is a high gravity wort of, for example, about 14 degrees Plato or more. The use of such high gravity worts allows greater productive throughput to be acheived for any given size of brewery operation, since less water need be carried through the process until such time as the product is actually bottled, or otherwise packaged for the retail or wholesale markets.

The degree of fermentability of the all-malt, wort is controlled by way of mashing the malt in at 65 to 80 degrees C. in the specified range of pH, (ie. 5.0 to 7.0). The higher the pH is adjusted, and the higher the temperature of the substantially isothermal mashing process, the lower the degree of fermentability in the resulting wort. It should be noted that although the mashing process is substantially isothermal over its entire duration, this is not intended to imply that the temperature cannot be cycled in the conventional manner to a mashing-off temperature in order to achieve a complete malt enzyme "kill". Such a cycling, as by raising the temperature to 77 degrees or higher, can be employed following a substantially isothermal mashing at temperatures of about 65 to 76 degrees, but is not needed at all following completion of higher temperature mashes, i.e. about 77°–80° C.).

While high mashing temperatures are useful in tailoring the extent of the conversion of a given amount of extract, it is also true that the higher the mashing temperature, the lower the yield of extract from a given amount of malt. By adjusting the pH of the mash, it becomes possible for a man skilled in the art to produce a wort having a degree of fermentability comparable to a wort produced using higher mashing temperatures but without any pH adjustment. The significance of this lies mainly in the fact that the wort produced from such a lower-temperature pH-adjusted mash will contain a greater amount of total extract than the corresponding wort produced from the higher temperature mash in which the pH was not adjusted. This is especially important in the manufacture of alcohol-reduced malt beverages since the higher yield of extract improves not only the economics of the process but also the flavour of the resulting product. In accordance with the practice of the present invention, it therefore becomes possible for a man skilled in the art to achieve extract yields of about 90% in the production of alcohol-reduced beverages, which compares very favourably with the 95% yield which is typical of conventional brewing process for the manufacture of regular beers (i.e. about 5% alcohol).

In any case, by mashing the malt at a temperature of 75 degrees C. or more and at a pH of greater than 5.8 up to about 7, for example, it is possible to achieve a degree of fermentability of about 50% or less. The following example illustrates the effect of various temperatures and pH's on the fermentability of the wort.

EXAMPLE #1

A series of experimental all-malt brews were prepared by utilizing the different mash pH and temperature regimens specified in Table 1. The mash bill in each case consisted of 390 g ground malt and 2600 ml of brewing water. The pH of each mash was upwardly adjusted with sodium hydroxide and the pH was measured halfway through the conversion rest period. The time of conversion was 60 minutes. The different degrees of fermentability of the wort for each of the different conditions of pH and temperature of the mash is indicated below.

TABLE 1

| Mash Temperature (C.) | 64 | 70 | 75 | 80 |
|---|---|---|---|---|
| Mash pH | 5.7 | 5.3 | 5.8 | 6.9 |
| Wort Fermentability (%) | 70 | 64 | 48 | 33 |

Mashing temperatures of greater than 80 degrees C. resulted only in incomplete and uneconomic conversions of the starch present in the mash, with a corresponding loss in yield, and hence efficiency, the effects of pH-adjustment notwithstanding. Moreover, a pH of greater than 7.0 did not effect the percent fermentability of the wort to any signifigant degree. Typically, mashes have a pH of about 5.0 up to a maximum of about 5.5. In keeping with the practice of one embodiment of the present invention, the pH is upwardly adjusted through the addition of a food grade base at mashing-in to produce a wort having a reduced degree of fermentability relative to a wort produced from the same malt without the pH adjustment. This results in the production of a product having a reduced alcohol concentration relative to a corresponding product in which the pH was not so adjusted. In this respect the instant process is especially advantageous in the production of not only alcohol-reduced beers in general, but of alcohol-free beers in particular since no distillation treatment is required to achieve the very low-alcohol concentrations which characterize such products. Accordingly, there is provided a process for producing a high residual, unfermentable extract-to-alcohol beer, said process consisting essentially of the steps of: preparing an all-malt wort by mashing the malt in at a temperature of between 65 and 80 degrees C., and maintaining said temperature throughout mashing; adjusting the intial pH of the mash upwardly to not more than about 7; continuing the mashing of the malt for a time sufficient to produce a fermentable wort having a degree of fermentability not exceeding about 70% and preferably not exceeding about 60–50%; hopping the wort to taste and kettle boiling the resulting mixture; and, fermenting the hopped wort to completion in a fermenter without any additional fermentable adjunct having been added. The adjustment of the pH is easily accomplished through the addition of a food grade base, such as sodium hydroxide for example. Once the mashing has been completed, but before the wort is hopped, it is believed to be desirable that the pH of the wort be restored through the addition of a food grade acid. This helps to avoid the unwanted extraction of excessive amounts of tannins and/or polyphenols from the hops and therefore helps to avoid an overly bitter tasting product.

EXAMPLE #2

A 60 liter all-malt mash was isothermally mashed at 80° C. for a period of one hour. The pH of the mash was initially adjusted to 6.8 using 0.14% NaOH, based on the dry weight of the ground malt used in the mash. This process yielded a 91% extraction efficiency, ((on a malt extract (as is) to wort basis)), and resulted in a wort having a 28% degree of fermentability with an original gravity of 6.10° Plato.

The pH of 40 liters of this wort was adjusted to a pH of 5.5 by adding sulphuric acid into the brew kettle, prior to the addition of the hops. The wort was then hopped, boiled for 90 minutes, fermented and finished to an "alcohol-free" beer using conventional brewing techniques.

Table 2, below, summarizes the analysis of this "alcohol-free" beer in a comparative format which also shows comparable analytical data, for a typical, North American, regular beer, produced in accordance with conventional brewing practices.

TABLE 2

|  | Alcohol-free beer | Typical Regular Beer |
|---|---|---|
| Colour (srm) | 2.0 | 2.5–3.5 |
| Foam (Sigma sec.) | 113 | 100–120 |
| pH | 4.6 | about 4.5 |
| Bitterness units (ppm) | 18 | 12–18 |
| Real extract (%) | 4.4 | 2–4 |
| Alcohol content (v/v %) | 0.93 | 4–5 |

It is implicit, from a consumer's perspective that an alcohol-free beer should differ from a regular beer only in respect of its alcohol content. The first two entries in Table 2 relate to the appearance of the product, and as is reflected by the data for these entries, this "alcohol-free" beer of the present invention is visually very comparable to a regular beer.

The third entry demonstrates that the pH manipulations as set out in the process described in Example 2, do not significantly effect the final pH of the "alcohol-free" beer, relative to a regular beer produced in accordance with prevailing North American brewing practices.

The fourth entry, "Bitterness Units", is an indicator of the beer's bitterness. This is one of the most significant factors in beer flavour evaluation. Again, notwithstanding the pH manipulations, the bitterness of this particular "alcohol-free" beer is comparable to that of a conventionally-brewed regular beer.

Another very significant organoleptic characteristic of a malt-beverage is its "body" or "mouth feel". This property is a direct function of the percentage of real extract in the beer. The data presented under the fifth entry in Table 2 shows that the instant "alcohol-free" beer compares very favourably with conventionally-brewed regular beers.

Another aspect of beer quality is measured by its tendency to form hazes over time. To expedite the evaluation of beer in this respect, a forced aging test is employed in the brewing industry pursuant to which the beer is held at 55° C. for six days, then its temperature is reduced to 0° C. for 24 hours, following which the haze is measured, using a haze meter calibrated in Formazin turbidity units, (FTU's). This test is utilized to emulate the effects associated with three months "on the shelf" aging of the beer. Following such forced aging, the above-mentioned "alcohol-free" beer was found to have a haze of 86 FTU's. This compares very favourably with the *initial* haze of a typical conventional brew which, without any aging, usually has a haze in the range of 50–100 FTU's. The surprising stability of the "alcohol-free" beer is very desirable from a shelf-life point of view, and completely unexpected given the a priori expectation that high temperature mashing would result in the formation of starch hazes.

In the final analysis however, the most significant aspect of the present "alcohol-free" beer is its taste compared to other commercially available "alcohol-free" beverages. Notably, the "alcohol-free" beverages produced in accordance with the practice of the present invention where adjudged to be very much superior to other "alcohol-free" beers currently on the market in that those produced by the process of the present invention more closely approximated a regular beer taste.

EAMPLE #3

Forty liters of a 6.2° Plato wort having a 29% degree of fermentability was prepared from an all-malt isothermal mash which was carried out at 80° C. at a pH of 6.2, adjusted using 0.14% NaOH— by weight based on the weight of malt. On completion of the mashing the wort was transferred to the brew kettle, and the pH was adjusted to pH 5.0 prior to the addition of hops. Following conventional fermentation and primary cellar storage, oxygen-free water was added to the beer in the ratio of 6 parts beer to 4 parts water. The diluted beer was then primed through the addition of 2%, weight by volume, of glucose and held in secondary storage. Colour and foam stabilizers were added in amounts sufficient to offset the effects of the aforementioned dilution of the beer with water.

The results of an analysis of beer before and after dilution is presented below in Table 3.

TABLE 3

|  | Before Dilution With Water | After Dilution With Water |
| --- | --- | --- |
| Color, srm | 1.7 | 1.6 |
| Foam, sigma sec. | 124 | 113 |
| pH | 4.2 | 4.6 |
| BU, ppm | 17.5 | 9.0 |
| Apparent extract, °P | 4.2 | 4.0 |

TABLE 3-continued

|  | Before Dilution With Water | After Dilution With Water |
| --- | --- | --- |
| Real extract, % | 4.4 | 4.2 |
| Alcohol v/v, % | 1.20 (low alcohol) | 0.69 (alcohol-free) |
| 1 Wk force, FTU | 110 | 50 |

EXAMPLE #4

Forty liters of wort was produced from an all-malt isothermal mash, carried out at 80° C. and a pH of 6.0, (to the foundation water comprised a 0.11% NaOH by weight, based on the dry weight of ground malt). The pH of the wort was adjusted prior to the addition of hops in the brew kettle, to pH 4.95. Following conventional fermentation and primary storage, the resulting beer was diluted by 50% with oxygen-free water. During secondary storage the dilute beer was primed with 2% weight by volume of sucrose, (based on the total volume of beer). Colour and foam stabilizer were added as in Example 3. An analysis of the final, alcohol-free beer produced in accordance with the procedure of the instant example is summarized below in Table 4.

TABLE 4

| Foam, sigma seconds | 128 |
| --- | --- |
| pH | 4.4 |
| BU, ppm | 9.5 |
| Apparent extract, °P | 4.1 |
| Real extract, % | 4.3 |
| Alcohol v/v, % | 0.53 |

EXAMPLE #5

The procedure employed in Example #4 was modified to produce 40 liters of wort using an all-malt mash programed at 80° C. for 1 hour, with a pH adjusted to 5.95. Instead of diluting the beer with water however, only one-half of the amount of malt and one-half the amount of NaOH was used to produce the same volume of a wort having an original gravity of only 3.2. Sucrose was added to produce a 2% wt by volume solution in the beer during secondary storage, along with colour and foam stabilizer. The final product analysed as shown below.

TABLE 5

| BU, ppm | 10.5 |
| --- | --- |
| Apparent extract, °P | 4.2 |
| Real extract, % | 4.4 |
| Alcohol, v/v, % | 0.49 |

In this way it was possible to produce alcohol-free beers without recourse to dilution with oxygen-free water.

We claim:
1. A process consisting essentially of the steps of:
preparing an all malt wort by mashing the malt in at a temperature of about 65°–80° C., and upwardly adjusting the pH of the mash to not more than about 7.0, said temperature and pH being selected so as to produce a fermentable wort having a degree of fermentability of substantially less than about 70%;
maintaining said temperature throughout mashing;
continuing to mash the malt for a time sufficient to substantially complete the conversion of the starch into fermentable and unfermentable sugars;

hopping the wort to taste and kettle boiling the resulting hopped wort;

and fermenting the boiled hopped wort to completion in a fermentor to thereby produce a brewed malt beverage having a high residual, unfermentable malt extract-to-alcohol ratio.

2. The process according to claim 1 wherein said brewed malt beverage is an alcohol reduced beer.

3. The process according to claim 2 wherein said alcohol reduced beer is a low alcohol beer containing about 1 to 3% alcohol on a volume by volume basis.

4. The process according to claim 2 wherein said alcohol reduced beer is an alcohol free beer having between 1 to 0.5% alcohol on a volume by volume basis.

5. The process according to claim 1 wherein said wort has an original Plato value of 14° or greater.

6. The process according to claim 1 wherein the pH is upwardly adjusted through the addition of a food grade base.

7. The process according to claim 6 wherein following mashing and prior to hopping the pH of the wort is restored through the addition of a food grade acid.

8. The process according to claim 1 wherein the pH is upwardly adjusted to within the range of about 5.0 to 7.0.

9. The process according to claim 8 wherein the pH is upwardly adjusted to within the range of 5.5 to 7.0.

10. The process according to claim 9 wherein the malt is mashed in at a temperature between 77° to 80° C.

11. The process according to claim 10 wherein said fermentable wort has a degree of fermentability of about 60% or less.

12. The process according to claim 11 wherein said degree of fermentability is 50% or less.

13. The process according to claim 12 wherein the extract efficiency from the original malt is 90% or more.

14. The process according to claim 1 further including the step of a post fermentation dilution with water to achieve a predetermined alcohol concentration in a brewed malt beverage.

15. The process according to claim 14 wherein the dilution water is oxygen free.

16. The process according to claim 14 wherein minor amounts of carbohydrate material are added to the brewed malt beverage to enhance the flavour and body thereof.

* * * * *